March 19, 1940.  A. WARMISHAM ET AL  2,194,413

OBJECTIVES FOR PHOTOGRAPHIC OR LIKE PURPOSES

Filed Dec. 3, 1938

Inventors
A. Warmisham
C. G. Wynne.
by
Attorneys

Patented Mar. 19, 1940

2,194,413

UNITED STATES PATENT OFFICE 2,194,413

OBJECTIVES FOR PHOTOGRAPHIC OR LIKE PURPOSES

Arthur Warmisham and Charles Gorrie Wynne, Leicester, England, assignors to Taylor, Taylor & Hobson Limited, Leicester, England, a company of Great Britain Application December 3, 1938, Serial No. 243,828
In Great Britain December 11, 1937

4 Claims. (Cl. 88—57)

This invention relates to wide aperture objectives for photographic or like purposes, of the kind comprising two compound dispersive meniscus components having their concave surfaces facing towards one another and disposed between two collective components. Objectives of this kind well-corrected for spherical and chromatic aberrations, coma, astigmatism and distortion are described in United States of America Patent No. 1,955,591, but for certain special purposes more especially in kinematography it is found desirable to provide an even higher degree of correction for distortion than is obtainable with such objectives. Thus with an F/2 objective of 2 inch focal length made in accordance with the data given in such prior patent and operating on the field of the 35 millimetre kinematograph film, a compression of the radial line from the centre to the extreme corner amounting only to .004 inch can be obtained.

The present invention has for its object to provide an objective of the kind described having a very high degree of correction for distortion, whereby the compression of the semi-diagonal in the example just mentioned will much more nearly approach the grain size of the negative emulsion, which may be say .0005 inch.

In the objective according to the present invention the radius of the rear surface of the front component (counting from the side of the longer conjugate) is greater than six times the focal length of the objective, and the radii of the concave and convex outer surfaces of the rear dispersive component are respectively less than .31 and .42 and greater than .25 and .35 of such focal length, all the surfaces of the objective being spherical surfaces. In some instances, more especially in the case of the shorter focal lengths, it may be desirable also to increase the refractive index of the glass used for the rear collective component to a value greater than 1.63.

Figure 1:
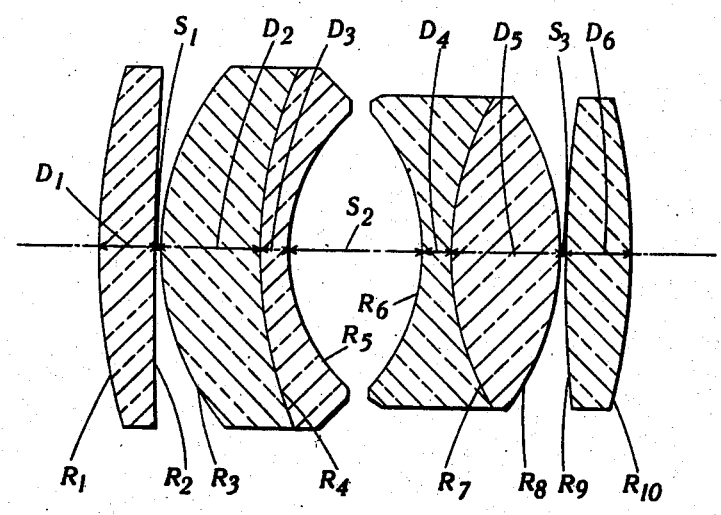
Figure 2:
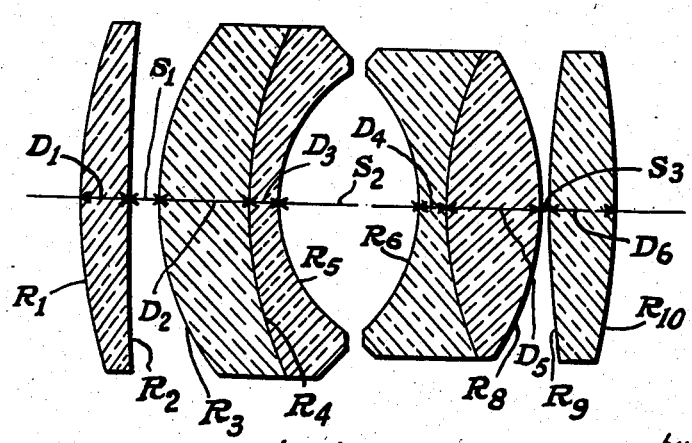

Numerical data for two convenient examples of objective according to the invention are set out in the tables below, and Figures 1 and 2 of the accompanying drawing respectively illustrate these two examples. In the drawing and also in the tables the radii of curvature of the various surfaces are indicated by $R_1 R_2 R_3$ ... (the positive sign indicating that the surface is convex towards the side of the longer conjugate and the negative sign that it is concave thereto), the thicknesses of the individual elements along the optical axis by $D_1 D_2 D_3$ ..., and the air gaps along the axis by $S_1 S_2 S_3$, in each case counting from the side of the longer conjugate. Each example has an equivalent focal length 1.000 and a relative aperture F/2.

Example 1

| Radius | Thickness or separation | Refractive index $n_D$ | Abbe V number |
|---|---|---|---|
| $R_1=+\ .9013$ | $D_1=\ .0812$ | 1.6130 | 59.3 |
| $R_2=+25.04$ | $S_1=\ .0065$ | | |
| $R_3=+\ .4064$ | $D_2=\ .1512$ | 1.6130 | 59.3 |
| $R_4=+\ .6960$ | $D_3=\ .0438$ | 1.6137 | 37.2 |
| $R_5=+\ .2657$ | $S_2=\ .1921$ | | |
| $R_6=-\ .3047$ | $D_4=\ .0438$ | 1.6468 | 33.8 |
| $R_7=+\ .4500$ | $D_5=\ .1597$ | 1.6437 | 48.3 |
| $R_8=-\ .4091$ | $S_3=\ .0020$ | | |
| $R_9=+1.746$ | $D_6=\ .1015$ | 1.6437 | 48.3 |
| $R_{10}=-1.001$ | | | |

Example 2

| Radius | Thickness or separation | Refractive index $n_D$ | Abbe V number |
|---|---|---|---|
| $R_1=+\ .8075$ | $D_1=\ .08134$ | 1.613 | 59.4 |
| $R_2=+6.016$ | $S_1=\ .03494$ | | |
| $R_3=+\ .39561$ | $D_2=\ .14737$ | 1.613 | 59.4 |
| $R_4=+\ .6016$ | $D_3=\ .04178$ | 1.6132 | 36.9 |
| $R_5=+\ .25276$ | $S_2=\ .21186$ | | |
| $R_6=-\ .29974$ | $D_4=\ .04206$ | 1.6457 | 33.9 |
| $R_7=+\ .52132$ | $D_5=\ .14958$ | 1.6458 | 48.1 |
| $R_8=-\ .39667$ | $S_3=\ .00491$ | | |
| $R_9=+1.4516$ | $D_6=\ .10213$ | 1.613 | 59.4 |
| $R_{10}=-\ .95968$ | | | |

For the longer ranges of focal length, Example 2, for which the second radius of 6.016, affords adequate distortion correction in most instances. Thus this example with a 3 inch focal length serves to reduce the compression of the semi-diagonal for a 35 millimetre kinematograph frame to .001 inch. Since, however, the linear distortion aberration increases as the cube of the angular field and as the first power only of the focal length, this example will not give sufficient improvement in the distortion correction for the shorter ranges of focal length for the special purposes for which the objective of the present invention is intended, and in such cases it is preferable to resort to Example 1 which has a greatly increased second radius of 25.04 and further also an increased refractive index of 1.6437 for the glass of the rear component. With this example a greatly improved distortion correction is obtained and for a focal length of only 2 inches, the distortion compression of the semi-diagonal in the case mentioned is reduced to .001 inch.

What we claim as our invention and desire to secure by Letters Patent is:

1. A photographic or like objective, well corrected for spherical and chromatic aberrations, coma, astigmatism and distortion and comprising two collective components, and two compound dispersive meniscus components disposed between and in axial alignment with the two collective components and having their concave surfaces facing towards one another, the radius of the rear surface of the front collective component (counting from the side of the longer conjugate) being greater than six times the equivalent focal length of the objective, whilst the radii of the concave and convex outer surfaces of the rear dispersive component are respectively less than .31 and .42 and greater than .25 and .35 of such focal length, all the surfaces of the objective being spherical surfaces.

2. A photographic or like objective as set forth in claim 1, in which the refractive index of the glass used for the rear collective component is greater than 1.63.

3. A photographic or like objective comprising four coaxial components, of which the two inner are compound, and having the numerical data set forth in the following table wherein $R_1 R_2 \ldots$ designate the radii of the successive lens surfaces counting from the front, $D_1 D_2 \ldots$ the axial thicknesses of the individual elements and $S_1 S_2 S_3$ the axial air separations, the objective having an equivalent focal length 1.000 and a relative aperture F/2:

| Radius | Thickness or separation | Refractive index $n_D$ | Abbe V number |
|---|---|---|---|
| $R_1 = +\ .9013$ | | | |
| | $D_1 = .0812$ | 1.6130 | 59.3 |
| $R_2 = +25.04$ | | | |
| | $S_1 = .0065$ | | |
| $R_3 = +\ .4064$ | | | |
| | $D_2 = .1512$ | 1.6130 | 59.3 |
| $R_4 = +\ .6960$ | | | |
| | $D_3 = .0438$ | 1.6137 | 37.2 |
| $R_5 = +\ .2657$ | | | |
| | $S_2 = .1921$ | | |
| $R_6 = -\ .3047$ | | | |
| | $D_4 = .0438$ | 1.6468 | 33.8 |
| $R_7 = +\ .4500$ | | | |
| | $D_5 = .1597$ | 1.6437 | 48.3 |
| $R_8 = -\ .4091$ | | | |
| | $S_3 = .0020$ | | |
| $R_9 = +\ 1.746$ | | | |
| | $D_6 = .1015$ | 1.6437 | 48.3 |
| $R_{10} = -\ 1.001$ | | | |

4. A photographic or like objective comprising four coaxial components, of which the two inner are compound, and having the numerical data set forth in the following table wherein $R_1 R_2 \ldots$ designate the radii of the successive lens surfaces counting from the front, $D_1 D_2 \ldots$ the axial thicknesses of the individual elements and $S_1 S_2 S_3$ the axial air separations, the objective having an equivalent focal length 1.000 and a relative aperture F/2:

| Radius | Thickness or separation | Refractive index $n_D$ | Abbe V number |
|---|---|---|---|
| $R_1 = +\ .8075$ | | | |
| | $D_1 = .08134$ | 1.613 | 59.4 |
| $R_2 = +\ 6.016$ | | | |
| | $S_1 = .03494$ | | |
| $R_3 = +\ .39561$ | | | |
| | $D_2 = .14737$ | 1.613 | 59.4 |
| $R_4 = +\ .6016$ | | | |
| | $D_3 = .04178$ | 1.6132 | 36.9 |
| $R_5 = +\ .25276$ | | | |
| | $S_2 = .21186$ | | |
| $R_6 = -\ .29974$ | | | |
| | $D_4 = .04206$ | 1.6457 | 33.9 |
| $R_7 = +\ .52132$ | | | |
| | $D_5 = .14958$ | 1.6458 | 48.1 |
| $R_8 = -\ .39667$ | | | |
| | $S_3 = .00491$ | | |
| $R_9 = +\ 1.4516$ | | | |
| | $D_6 = .10213$ | 1.613 | 59.4 |
| $R_{10} = -\ .95968$ | | | |

ARTHUR WARMISHAM.
CHARLES GORRIE WYNNE.